Patented Sept. 29, 1942

2,297,083

UNITED STATES PATENT OFFICE 2,297,083

METHOD FOR DISSOLVING HARD AND DIFICULTLY SOLUBLE FOSSIL RESINS, ESPECIALLY COPAL RESINS

Oskar Svensson, Sundbyberg, Sweden

No Drawing. Application December 9, 1939, Serial No. 308,474. In Sweden December 21, 1938

6 Claims. (Cl. 260—99)

The object of the present invention is a method for dissolving fossil-resins which are difficult to dissolve, especially those which belong to the copal group, such resins being usually remarkable for their great hardness and the great difficulty with which they can be dissolved. As examples of such resins may be mentioned Banguela, Zanzibar, Mozambique and Congo resins, which are the hardest and most difficult to dissolve. When these resins are treated with the usual solvents, such as alcohol, ether, benzine, the resin swells but very little of it is dissolved.

In order to obtain concentrated solutions of such resins, it has hitherto been necessary to melt them before dissolving them, but even then they are very difficult to dissolve. Further the melting of these hard resins requires high temperatures, about 250–500° C., and a considerable time, which makes the process expensive and involved, in addition to which the colour of the resins becomes darker during the melting process.

The object of the present invention is a method by which such resins can easily be dissolved without previous melting. The characteristic feature of the invention is that the resin, in a finely divided condition, and in the presence of a solvent, is subjected to a process of oxidation in such a manner that oxygen is statu nascendi can act on the resin in the presence of the solvent. It is advantageous to have a catalysing agent present during this process.

There are several possible methods of carrying out the process. For example, the finely divided resin may be intimately mixed with a solvent and then exposed to the action of an oxidizing agent. Alternatively, the finely divided resin may be first mixed with an oxidising agent, for example, a peroxide, and then be mixed with a solvent, whereupon a substance which sets free the oxygen is added, such as an acid or a base. Under such circumstances, the released oxygen reacts in statu nascendi with the particles of resin which are thus oxidized and are then immediately dissolved in the solvent present. In this manner the time required for solution is very short, especially if the mixture is heated at a moderate temperature below 100° C. Concentrated solutions may then be obtained. If an acid or a base is used in the process for liberating the oxygen, it should afterwards be neutralized.

Example

Finely divided resin, for example, Congo resin, is intimately mixed with about 1–2 per cent by weight of manganese peroxide or vanadic acid. Over this mixture is poured about 10% by weight of a solvent, for example, ethyl alcohol, or a mixture containing 50% ethyl alcohol, 40% benzol and 10% acetone. Thereupon, 30% hydrogen peroxide suitably together with nitric acid, say 10–20%, is added to the mixture which is then allowed to stand in a water bath for 3–4 hours at about 70–80° C. At ordinary temperatures a longer time is required, for example, 20–24 hours. In this process, the metallic peroxide acts as a catalysing agent and releases oxygen from the hydrogen peroxide. If necessary, further quantities of resin, mixed with the metallic peroxide may be added to the mixture. After the time stated, about 90–95% of the resin has been dissolved to form a clear solution, the colour of which depends on the natural colour of the resin used. If a drying oil, for example, linseed oil or castor oil, be added to this solution or to the solvent, the result is a copal varnish.

Instead of the manganese peroxide or vanadic acid mentioned in the example, it is possible to use other peroxides or catalysing metallic oxides, metallic salts or metals, such as silver, platinum, nickel, cobalt or oxides or salts thereof. If the solvent is dissolved in water, chlorine may be used as the oxidizing agent.

As solvents may be used ethyl alcohol, butyl alcohol, ether, acetone, esters, hydro-carbons, ketones, or suitable mixtures thereof, such as acetone-benzol, benzine-benzol, etc.

I claim:

1. The process of dissolving hard and difficultly soluble fossil resins, which comprises subjecting such a resin in a finely divided state and in the presence of an inert solvent to the action of an aqueous 30 per cent hydrogen peroxide solution and a substance capable of liberating oxygen in the nascent state therefrom.

2. The process of dissolving hard and difficultly soluble fossil resins, which comprises subjecting such a resin in a finely divided state and in the presence of an inert solvent to the action of hydrogen peroxide and a metal peroxide.

3. The process of dissolving hard and difficultly soluble fossil resins, which comprises subjecting such a resin in a finely divided state and in the presence of an inert solvent to the action of a metal peroxide and an acid capable of liberating nascent oxygen therefrom.

4. The process of dissolving hard and difficultly soluble fossil resins, which comprises subjecting such a resin in a finely divided state and in the presence of an inert solvent to the action of hydrogen peroxide and nitric acid.

5. The process of dissolving hard and difficultly soluble fossil resins, which comprises subjecting such a resin in a finely divided state and in the presence of an inert solvent to the action of hydrogen peroxide, nitric acid and a metal peroxide.

6. The process of dissolving hard and difficultly soluble fossil resins, which comprises subjecting such a resin in a finely divided state and in the presence of an inert solvent to the action of a metal peroxide and a substance capable of liberating nascent oxygen therefrom.

OSKAR SVENSSON.